(12) United States Patent
Takaki et al.

(10) Patent No.: US 12,497,198 B2
(45) Date of Patent: Dec. 16, 2025

(54) AIRCRAFT

(71) Applicant: SUBARU CORPORATION, Tokyo (JP)

(72) Inventors: Kazuhisa Takaki, Tokyo (JP); Hokuto Yamane, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/664,364

(22) Filed: May 15, 2024

(65) Prior Publication Data

US 2024/0383624 A1    Nov. 21, 2024

(30) Foreign Application Priority Data

May 15, 2023  (JP) ................. 2023-080129

(51) Int. Cl.
  *B64U 10/16* (2023.01)
  *B64D 31/00* (2024.01)
  *B64U 30/297* (2023.01)

(52) U.S. Cl.
  CPC ............. *B64U 10/16* (2023.01); *B64D 31/00* (2013.01); *B64U 30/297* (2023.01); *B64U 2201/20* (2023.01)

(58) Field of Classification Search
  CPC ...... B64U 30/29; B64U 30/297; B64C 27/52; B64C 29/0033
  See application file for complete search history.

(56) References Cited

U.S. PATENT DOCUMENTS 9,296,477 B1 *  3/2016  Coburn ................. B64D 35/04
10,351,234 B1 *  7/2019  Dennis .................... B64C 27/52
2010/0108801 A1 *  5/2010  Olm ........................ B64U 50/19
                                                                 244/17.23
2016/0325829 A1    11/2016  Ahn et al.
2018/0105266 A1    4/2018  Lee

FOREIGN PATENT DOCUMENTS

| EP | 3 269 640 A1 | 1/2018 |
| JP | 2016-135859 A | 7/2016 |
| JP | 2020-131779 A | 8/2020 |
| JP | 6772917 B | 10/2020 |

OTHER PUBLICATIONS

Extended European Search Report issued Oct. 18, 2024 in European Patent Application No. 24173461.5, 7 pages.

* cited by examiner

*Primary Examiner* — Joshua D Huson
*Assistant Examiner* — Peter A Taraschi
(74) *Attorney, Agent, or Firm* — Finnegan, Henderson, Farabow, Garrett & Dunner, LLP

(57) ABSTRACT

An aircraft includes: a main body; arms extending substantially horizontally from the main body; rotors that are located at distal ends of the arms and generate lift by rotating; first motors that are coupled to the rotors and rotate the rotors; motor mounts supporting the first motors; and second motors that rotate the motor mounts relative to the arms. The motor mounts each includes a mount proximal end, a mount distal end, and a bent part. The first motors are each fixed to the mount distal end. The mount proximal end is disposed so as to extend substantially vertically upward from the arm. The motor mounts are each coupled to the distal end. The second motors each rotates the mount proximal end with respect to the arm to switch an orientation of a plane of rotation of the rotor between a radially inclined orientation and a circumferentially inclined orientation.

4 Claims, 6 Drawing Sheets

AIRCRAFT

CROSS-REFERENCE TO RELATED APPLICATIONS

The present application is based on and claims benefit of priority to Japanese Patent Application No. 2023-080129 filed on May 15, 2023, the entire contents of which are hereby incorporated by reference.

BACKGROUND OF THE INVENTION

Field of the Invention

The present disclosure relates to an aircraft.

Description of Background Art

For example, Japanese Patent No. 6772917 describes an unmanned aerial vehicle having rotors. The entire contents of this publication are incorporated herein by reference.

SUMMARY OF THE INVENTION

According to one aspect of the present invention, an aircraft includes a main body, arms extending substantially horizontally from the main body, rotors each of which is positioned at a distal end of a corresponding arm of the arms and generates lift by rotating, first motors each of which is coupled to a corresponding rotor of the rotors and rotates the corresponding rotor, motor mounts supporting the first motors respectively, and second motors that rotate the motor mounts relative to the arms respectively. Each of the motor mounts includes a mount proximal end adjacent to the corresponding arm, a mount distal end adjacent to a corresponding first motor, and a bent part bent at a predetermined angle, each of the first motors is fixed to the mount distal end such that an axis of rotation of the corresponding rotor is inclined with respect to the mount proximal end, the mount proximal end is disposed so as to extend substantially vertically upward from the corresponding arm, the motor mounts are each coupled to the distal end of the corresponding arm so as to be rotatable about an axis extending in an extending direction of the mount distal end, and each of the second motors rotates the mount proximal end with respect to the corresponding arm to switch an orientation of a plane of rotation of the corresponding rotor between a radially inclined orientation in which the plane of rotation is inclined in a radial direction away from the main body and a circumferentially inclined orientation in which the plane of rotation is inclined in a tangential direction of a circumference around the main body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
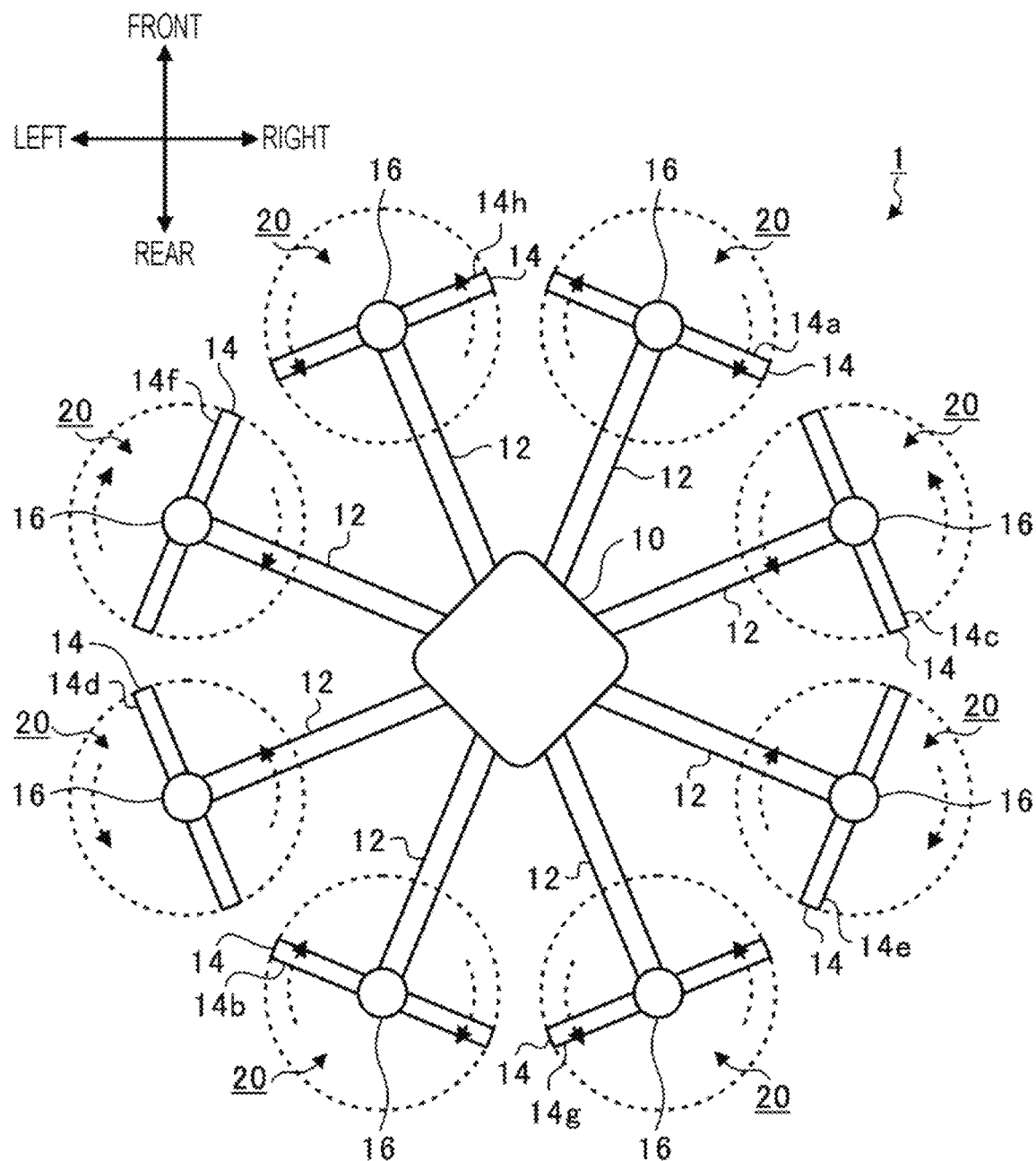
FIG. 1 is a schematic plan view illustrating the structure of an aircraft according to an embodiment of the present disclosure.

Embodiments will now be described with reference to the accompanying drawings, wherein like reference numerals designate corresponding or identical elements throughout the various drawings.

FIG. 1 is a schematic plan view illustrating the structure of an aircraft 1 according to an embodiment of the present disclosure. The vertical direction in FIG. 1 corresponds to the front-rear direction of the aircraft 1, and the horizontal direction in FIG. 1 corresponds to the horizontal direction of the aircraft 1. The aircraft 1 is, for example, an unmanned aerial vehicle, such as a drone.

The aircraft 1 includes a main body 10, arms 12, rotors 14, and first motors 16.

The main body 10 has a rectangular box shape, for example. The arms 12 extend substantially horizontally from the main body 10. For example, the aircraft 1 includes eight arms 12. However, the number of arms 12 is not limited to eight, and may be any number from two to seven, or nine or more. In the example in FIG. 1, eight arms 12 are provided at substantially equal intervals in the circumferential direction of the main body 10. The eight arms 12 have substantially the same length.

The rotors 14 are located at the distal ends of the arms 12. The rotors 14 are provided so as to correspond to the arms 12 one-to-one. The rotors 14 are rotary wings that generate lift by rotating. The first motors 16 are located at the distal ends of the arms 12. The first motors 16 are provided so as to correspond to the rotors 14 one-to-one. The first motors 16 are coupled to the rotors 14. The first motors 16 rotate the rotors 14.

In the example in FIG. 1, because there are eight arms 12, eight rotors 14 and eight first motors 16 are provided. In the example in FIG. 1, because the arms 12 are provided at substantially equal intervals in the circumferential direction of the main body 10, the rotors 14 and the first motors 16 are also provided at substantially equal intervals in the circumferential direction of the main body 10. Furthermore, because the eight arms 12 have substantially the same length, the eight rotors 14 and the eight first motors 16 are substantially located on the circumference of a circle centered on the main body 10.

The number of rotors 14 and the number of first motors 16 are not limited to eight, and may be any number from two to seven, or nine or more as long as the number of rotors 14 and the number of first motors 16 are more than one and the same as the number of arms 12.

In the example in FIG. 1, for convenience, the eight rotors 14 include a first rotor 14a, a second rotor 14b, a third rotor 14c, a fourth rotor 14d, a fifth rotor 14e, a sixth rotor 14f, a seventh rotor 14g, and an eighth rotor 14h.

The first rotor 14a is, for example, the rotor 14 located on the front right side. The second rotor 14b is located on the opposite side of the main body 10 from the first rotor 14a, for example, and is the rotor 14 located on the rear left side. The third rotor 14c is located to the rear right side of the first rotor 14a, for example, and is the rotor 14 located on the front right side. The fourth rotor 14d is located on the opposite side of the main body 10 from the third rotor 14c, for example, and is the rotor 14 located on the rear left side.

The fifth rotor 14e is located behind the third rotor 14c, for example, and is the rotor 14 located on the rear right side. The sixth rotor 14f is located on the opposite side of the main body 10 from the fifth rotor 14e, for example, and is the rotor 14 located on the front left side. The seventh rotor 14g is located to the rear left side of the fifth rotor 14e, for example, and is the rotor 14 located on the rear right side. The eighth rotor 14h is located on the opposite side of the main body 10 from the seventh rotor 14g, for example, and is the rotor 14 located on the front left side.

Among the eight rotors 14, the first rotor 14a, the second rotor 14b, the fifth rotor 14e, and the sixth rotor 14f rotate, for example, in the clockwise direction as viewed from above the aircraft 1, as indicated by dashed arrows in FIG. 1. Among the eight rotors 14, the third rotor 14c, the fourth rotor 14d, the seventh rotor 14g, and the eighth rotor 14h rotate, for example, in the counterclockwise direction as viewed from above the aircraft 1, as indicated by the dashed arrows in FIG. 1.

In FIG. 1, circular trajectories traced by the tips of the rotors 14 during rotation of the rotors 14 are indicated by dashed-line circles. Hereinbelow, the planes virtually formed by the rotating rotors 14 may be referred to as the planes of rotation 20 of the rotors 14.

Figure 2:
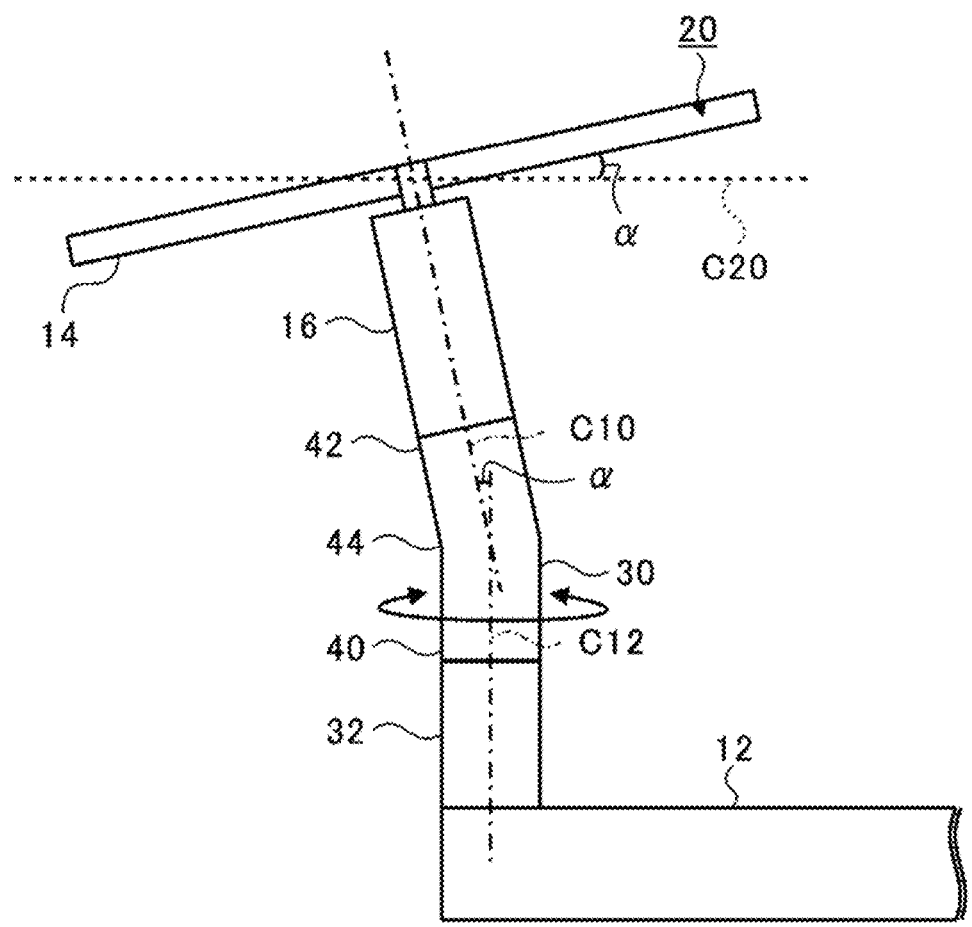
FIG. 2 is a partially enlarged side view illustrating a distal end of an arm and the vicinity thereof in an enlarged manner.

FIG. 2 is a partially enlarged side view illustrating the distal end of the arm 12 and the vicinity thereof in an enlarged manner. Because the eight arms 12 have the same structure, one representative arm 12 will be described in FIG. 2. The distal ends of the other arms 12 have the same structure as that in FIG. 2.

The aircraft 1 further includes motor mounts 30 and second motors 32. The motor mounts 30 have a bent columnar shape. The motor mounts 30 are provided so as to correspond to the first motors 16 one-to-one and support the first motors 16. The motor mounts 30 are coupled to the distal ends of the arms 12 via the second motors 32.

Hereinbelow, in each motor mount 30, the end adjacent to the arm 12 may be referred to as a mount proximal end 40. The end of the motor mount 30 adjacent to the first motor 16 may be referred to as a mount distal end 42. In FIG. 2, a one-dot chain line C10 indicates the center axis of the mount distal end 42 and extends in the extending direction of the mount distal end 42. A one-dot chain line C12 indicates the center axis of the mount proximal end 40 and extends in the extending direction of the mount proximal end 40. The center axis of the mount distal end 42 intersects the center axis of the mount proximal end 40.

The motor mount 30 has a bent part 44 between the mount proximal end 40 and the mount distal end 42. The bent part 44 is a part where the motor mount 30 is bent at a predetermined angle α. As illustrated in FIG. 2, the predetermined angle α corresponds to the angle formed between the center axis of the mount proximal end 40 indicated by the one-dot chain line C12 and the center axis of the mount distal end 42 indicated by the one-dot chain line C10. The predetermined angle α is set to any angle from several to ten and several degrees, for example.

The first motor 16 is fixed to the mount distal end 42 such that the axis of rotation of the rotor 14 is inclined with respect to the mount proximal end 40. For example, the first motor 16 is fixed to the mount distal end 42 such that the center axis of the mount distal end 42 indicated by the one-dot chain line C10 coincides with the axis of rotation of the rotor 14.

The second motors 32 are, for example, stepping motors or servo motors, which can control the angle of rotation or the position of rotation. The second motors 32 are provided so as to correspond to the motor mounts 30 one-to-one, for example, and are fixed to the distal ends of the arms 12. The mount proximal ends 40 are rotatably coupled to the second motors 32. The second motors 32 rotate the mount proximal ends 40 of the motor mounts 30 with respect to the arms 12.

For example, the mount proximal ends 40 are disposed so as to extend substantially vertically upward from the distal ends of the arms 12. The mount proximal ends 40 can be rotated by the second motors 32 about the center axes of the mount proximal ends 40, indicated by the one-dot chain lines C12, as indicated by a double-headed arrow in FIG. 2. In other words, the mount proximal ends 40 are rotatably coupled to the distal ends of the arms 12 via the second motors 32.

In the above example, the second motors 32 are provided at the distal ends of the arms 12. However, the second motors 32 do not necessarily have to be provided at the distal ends of the arms 12. For example, the second motors 32 may be provided in the main body 10 and, in combination with shafts, gears, and the like, rotate the motor mounts 30 provided at the distal ends of the arms 12 with respect to the distal ends of the arms 12.

In the above example, the second motors 32 are provided so as to correspond to the motor mounts 30 one-to-one. However, for example, motor mounts 30 may be rotated in conjunction with one another by a single second motor 32.

Because the motor mounts 30 have the bent parts 44, the planes of rotation 20 of the rotors 14 are inclined with respect to the horizontal plane indicated by a dashed line C20 in FIG. 2. The inclination angle of the planes of rotation 20 of the rotors 14 is substantially the same as the angle at which the bent parts 44 of the motor mounts 30 are bent, that is, the predetermined angle α.

Because the planes of rotation 20 of the rotors 14 are inclined with respect to the horizontal plane, both the lift in the vertical direction and the propulsion in the inclination directions of the planes of rotation 20 of the rotors 14 are generated in the aircraft 1. This contributes to the yawing moment. The inclination direction is the direction in which the plane is inclined downward with respect to the horizontal plane. For example, the inclination direction in the example in FIG. 2 is the left direction.

In the aircraft 1, the second motors 32 rotate the mount proximal ends 40 with respect to the arms 12 to change the orientation of the planes of rotation 20 of the rotors 14. In this embodiment, example orientations of the planes of rotation 20 of the rotors 14 include a radially inclined orientation and a circumferentially inclined orientation.

In the radially inclined orientation, the plane of rotation 20 of the rotor 14 is inclined in the radial direction, which is a direction substantially away from the main body 10 in the horizontal direction. For example, in the radially inclined orientation, the plane of rotation 20 of the rotor 14 is inclined such that a portion of the plane of rotation 20 of the rotor 14 farthest from the main body 10 in the horizontal direction is vertically lower than a portion of the plane of rotation 20 of the rotor 14 closest to the main body 10. That is, in the radially inclined orientation, the plane of rotation 20 of the rotor 14 is inclined in the radial direction, as viewed from the main body 10.

In the circumferentially inclined orientation, the plane of rotation 20 of the rotor 14 is inclined in a tangential direction of a circle centered on the main body 10. For example, in the circumferentially inclined orientation, the plane of rotation 20 of the rotor 14 is inclined such that a portion of the plane of rotation 20 of the rotor 14 on one side in the circumferential direction of the main body 10 is vertically lower than a portion of the plane of rotation 20 of the rotor 14 on the other side in the horizontal direction. That is, in the circumferentially inclined orientation, the plane of rotation 20 of the rotor 14 is inclined substantially in the circumferential direction, as viewed from the main body 10. The circumferential direction includes the clockwise and the counter-clockwise directions when the main body 10 is viewed from above.

In the aircraft 1, the second motors 32 rotate the mount proximal ends 40 with respect to the arms 12 to switch the orientation of the planes of rotation 20 of the rotors 14 between the radially inclined orientation and the circumferentially inclined orientation.

Figure 3:
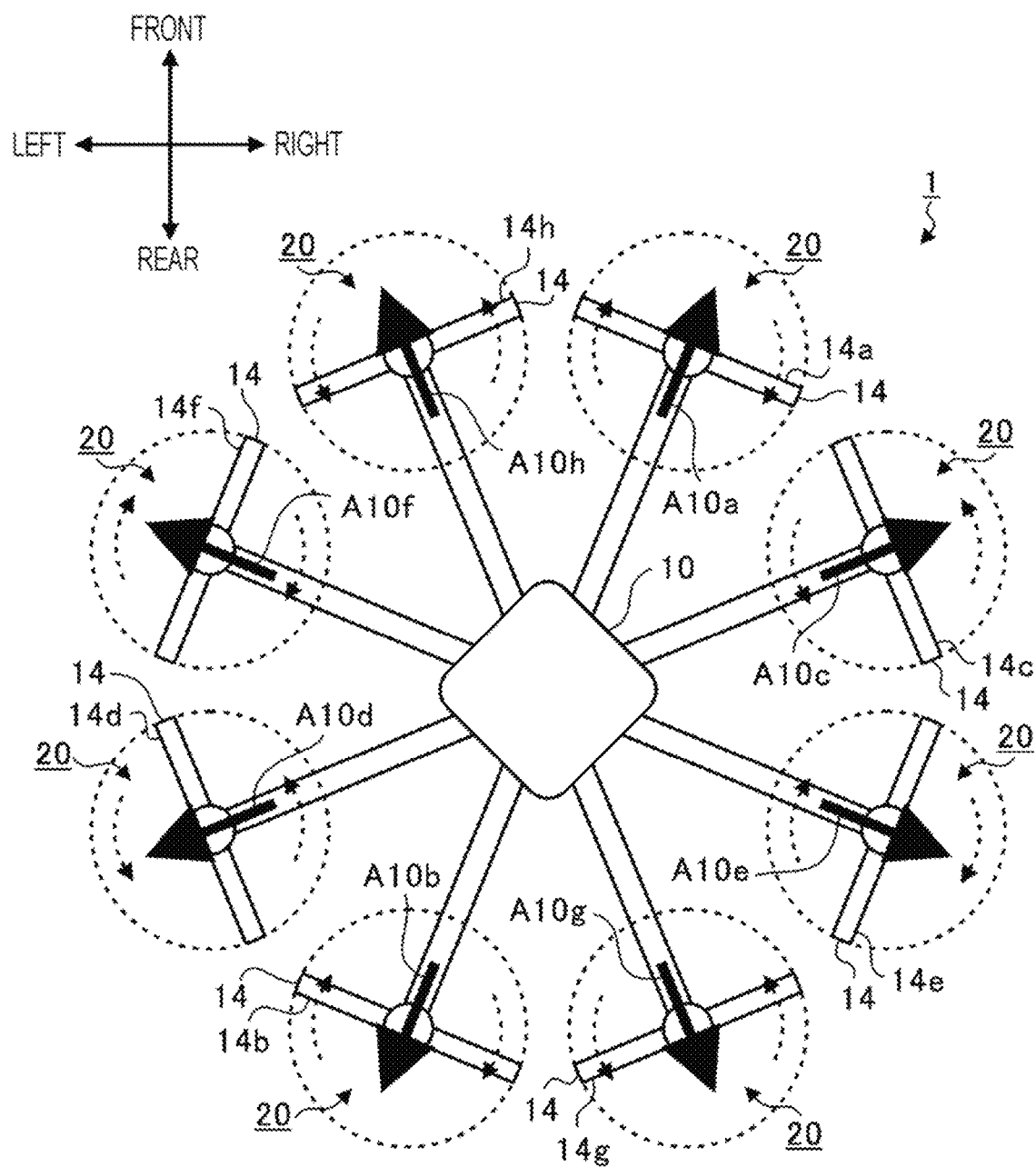
FIG. 3 is a schematic plan view illustrating a radially inclined orientation.

FIG. 3 is a schematic plan view illustrating a radially inclined orientation; In FIG. 3, bold arrows A10a to A10h conceptually indicate the directions in which the planes of rotation 20 of the rotors 14 are inclined in the radially inclined orientation. In the planes of rotation 20, the portions corresponding to the heads of the bold arrows A10a to A10h are located vertically below the portions corresponding to the tails of the bold arrows A10a to A10h. In short, the bold arrows A10a to A10h point the directions in which the planes of rotation 20 are inclined downward.

The bold arrow A10a indicates the inclination direction of the plane of rotation 20 of the first rotor 14a. The bold arrow A10b indicates the inclination direction of the plane of rotation 20 of the second rotor 14b. The bold arrow A10c indicates the inclination direction of the plane of rotation 20 of the third rotor 14c. The bold arrow A10d indicates the inclination direction of the plane of rotation 20 of the fourth rotor 14d. The bold arrow A11e indicates the inclination direction of the plane of rotation 20 of the fifth rotor 14e. The bold arrow A10f indicates the inclination direction of the plane of rotation 20 of the sixth rotor 14f. The bold arrow A10g indicates the inclination direction of the plane of rotation 20 of the seventh rotor 14g. The bold arrow A10h indicates the inclination direction of the plane of rotation 20 of the eighth rotor 14h.

In the radially inclined orientation, the tails of the bold arrows A10a to A10h are located closer to the main body 10, and the heads of the bold arrows A10a to A10h are located farther from the main body 10. In other words, in the radially inclined orientation, all the bold arrows A10a to A10h point the directions radially away from the main body 10 along the arms 12.

That is, in the radially inclined orientation, the planes of rotation 20 of all the rotors 14 are inclined in the radial direction centered on the main body 10. FIG. 2 described above is a partially enlarged side view in the radially inclined orientation.

Figure 4:
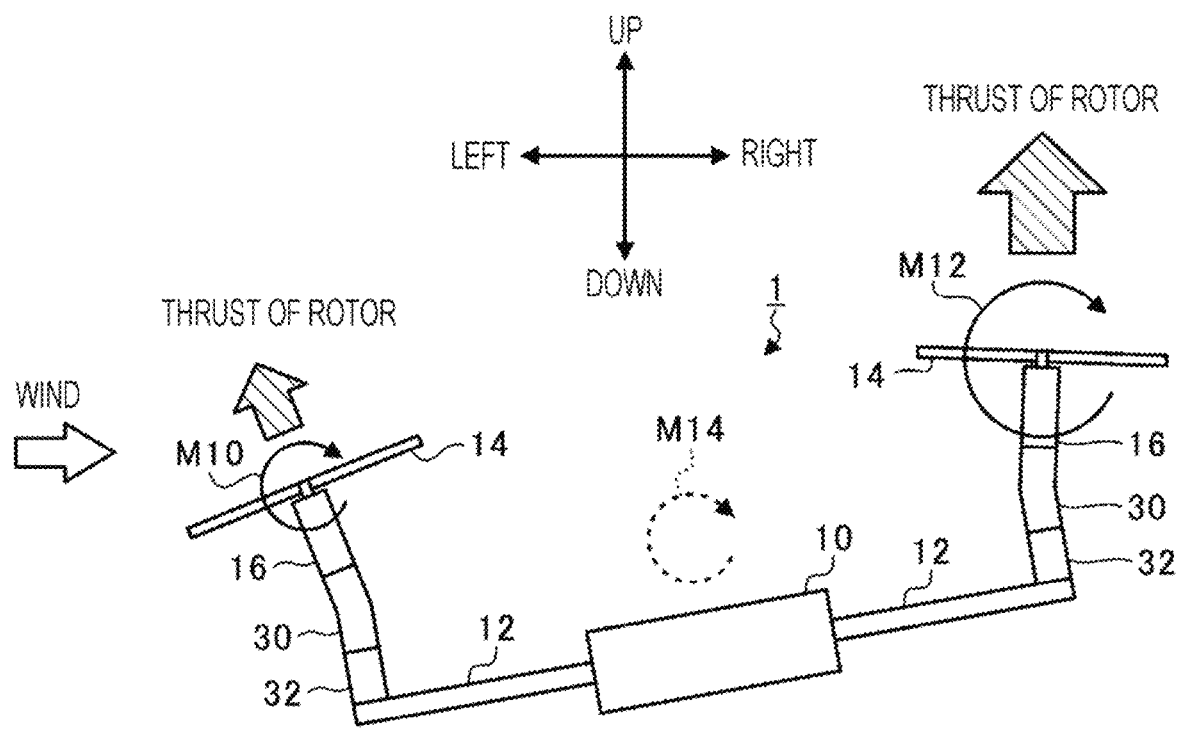
FIG. 4 is a side view illustrating an operation at the time of the radially inclined orientation.

FIG. 4 is a side view illustrating an operation at the time of the radially inclined orientation; In FIG. 4, the planes of rotation 20 of the rotors 14 are in the radially inclined orientation. In the example in FIG. 4, it is assumed that the aircraft 1 receives the wind from the left side, as indicated by an empty arrow, and the orientation of the aircraft 1 is inclined.

Because the planes of rotation 20 of the rotors 14 are in the radially inclined orientation, in the rotors 14 on the left side of the aircraft 1, the inflow rate of the wind to the lower surfaces of the rotors 14 is lower than that in the case where the planes of rotation 20 are horizontal. Thus, in the rotors 14 on the left side of the aircraft 1, the pitching moment acting on the rotors 14 decreases, as indicated by an arrow M10, and the thrust of the rotors 14 decreases.

In contrast, because the planes of rotation 20 of the rotors 14 are in the radially inclined orientation, in the rotors 14 on the right side of the aircraft 1, the inflow rate of the wind to the lower surfaces of the rotors 14 is higher than that in the case where the planes of rotation 20 are horizontal. Thus, in the rotors 14 on the right side of the aircraft 1, the pitching moment acting on the rotors 14 increases, as indicated by an arrow M12, and the thrust of the rotors 14 increases.

As described, in the aircraft 1, the thrust of the rotors 14 on the left side and the thrust of the rotors 14 on the right side differ, as indicated by the hatched arrows in different sizes. In the aircraft 1, the difference in the thrust among the rotors 14 reduces the pitching moment acting on the aircraft 1, as indicated by a dashed-line arrow M14, compared with a case where the planes of rotation 20 are horizontal.

The pitching moment acting on the aircraft 1 is a factor that hinders the flight control of the aircraft 1. However, because the pitching moment acting on the aircraft 1 decreases in the situation illustrated in FIG. 4, the flight control of the aircraft 1 is less likely to be hindered. Accordingly, the control for returning the orientation of the aircraft 1 to an appropriate orientation is less likely to be hindered, thus improving the roll-angle control tracking performance of the aircraft 1.

Herein, the operation in the case where the aircraft 1 receives the wind from the side has been described. Also in the case where the aircraft 1 receives the wind from the front or the rear, the same operation is performed. For example, also when the aircraft 1 receives the wind from the front, the pitching moment acting on the aircraft 1 decreases, and the flight control of the aircraft 1 is less likely to be hindered. Accordingly, the control for returning the orientation of the aircraft 1 to an appropriate orientation is less likely to be hindered, thus improving the pitch-angle control tracking performance of the aircraft 1.

Figure 5:
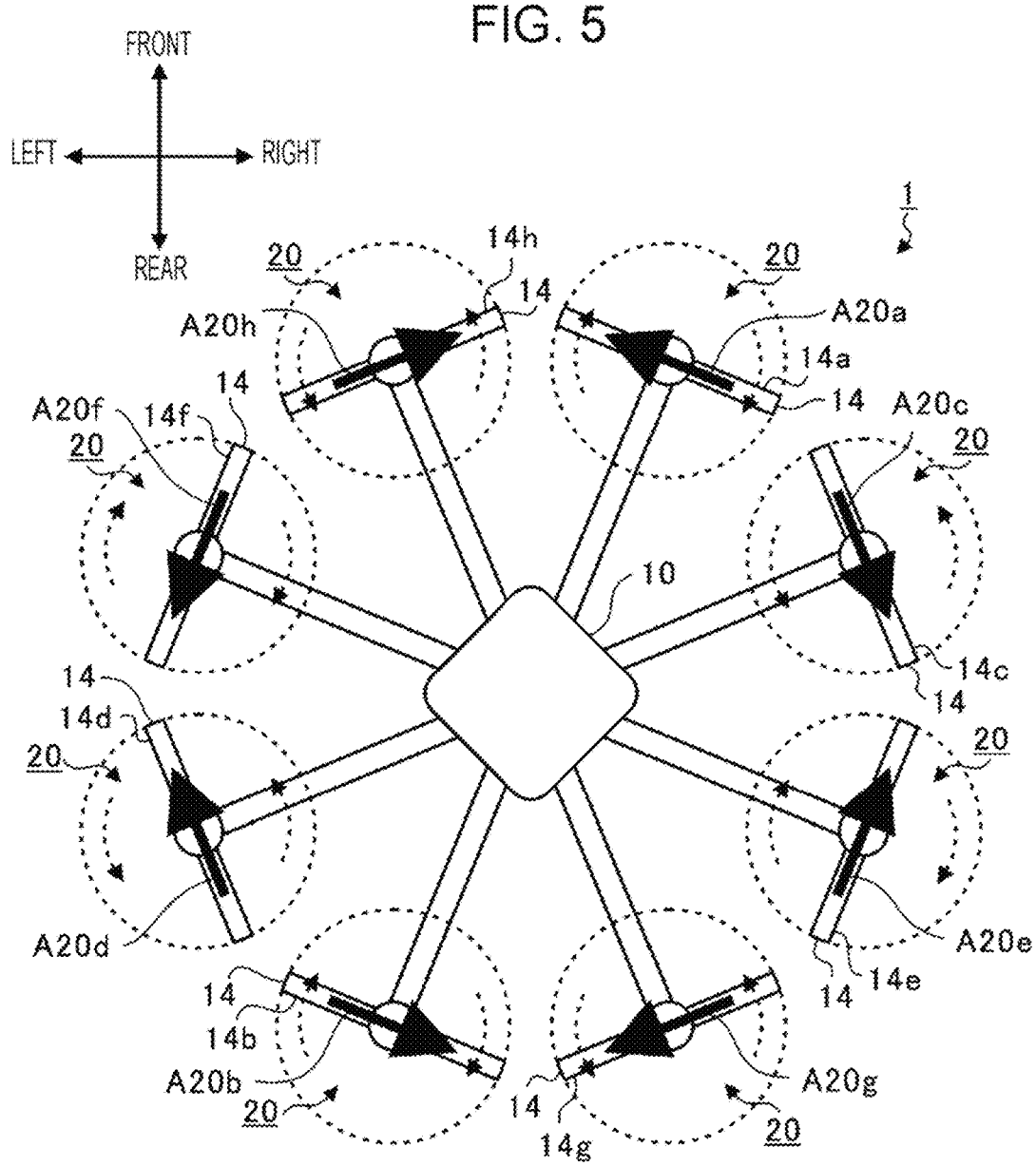
FIG. 5 is a schematic plan view illustrating a circumferentially inclined orientation.

FIG. 5 is a schematic plan view illustrating a circumferentially inclined orientation. In FIG. 5, bold arrows A20a to A20h conceptually indicate the directions in which the planes of rotation 20 of the rotors 14 are inclined in the circumferentially inclined orientation. The bold arrows A20a to A20h indicate that, in the planes of rotation 20, the portions corresponding to the heads of the bold arrows A20a to A20h are located vertically below the portions corresponding to the tails of the bold arrows A20a to A20h. In short, the bold arrows A20a to A20h point the directions in which the planes of rotation 20 are inclined downward.

The bold arrow A20a indicates the inclination direction of the plane of rotation 20 of the first rotor 14a. The bold arrow A20b indicates the inclination direction of the plane of rotation 20 of the second rotor 14b. The bold arrow A20c indicates the inclination direction of the plane of rotation 20 of the third rotor 14c. The bold arrow A20d indicates the inclination direction of the plane of rotation 20 of the fourth rotor 14d. The bold arrow A20e indicates the inclination direction of the plane of rotation 20 of the fifth rotor 14e. The bold arrow A20f indicates the inclination direction of the plane of rotation 20 of the sixth rotor 14f. The bold arrow A20g indicates the inclination direction of the plane of rotation 20 of the seventh rotor 14g. The bold arrow A20h indicates the inclination direction of the plane of rotation 20 of the eighth rotor 14h.

In the circumferentially inclined orientation, all the bold arrows A20a to A20h point the tangential direction of a circle centered on the main body 10 when the aircraft 1 is viewed from above.

For example, in the first rotor 14a, as indicated by the bold arrow A20a, the plane of rotation 20 is inclined in the counterclockwise tangential direction of the circumference. In the second rotor 14b, as indicated by the bold arrow A20b, the plane of rotation 20 is inclined in the counterclockwise tangential direction of the circumference. In the third rotor 14c, as indicated by the bold arrow A20c, the plane of rotation 20 is inclined in the clockwise tangential direction of the circumference. In the fourth rotor 14d, as indicated by the bold arrow A20d, the plane of rotation 20 is inclined in the clockwise tangential direction of the circumference.

In the fifth rotor 14e, as indicated by the bold arrow A20e, the plane of rotation 20 is inclined in the counterclockwise tangential direction of the circumference. In the sixth rotor 14f, as indicated by the bold arrow A20f, the plane of rotation 20 is inclined in the counterclockwise tangential direction of the circumference. In the seventh rotor 14g, as indicated by the bold arrow A20g, the plane of rotation 20 is inclined in the clockwise tangential direction of the circumference. In the eighth rotor 14h, as indicated by the bold arrow A20h, the plane of rotation 20 is inclined in the clockwise tangential direction of the circumference.

When the aircraft 1 turns in the yaw direction, the counter torque of the rotors 14 is used. When the rotors 14 are rotating clockwise, the counter torque in the counterclockwise direction acts on the main body 10. In contrast, when the rotors 14 are rotating counterclockwise, the counter torque in the clockwise direction acts on the main body 10.

Accordingly, by producing a difference in the rotational speed such that the rotational speed of the rotors 14 rotating clockwise is higher than the rotational speed of the rotors 14 rotating counterclockwise, it is possible to turn the aircraft 1 in the counterclockwise direction, or left. Furthermore, by producing a difference in the rotational speed such that the rotational speed of the rotors 14 rotating counterclockwise is higher than the rotational speed of the rotors 14 rotating clockwise, it is possible to turn the aircraft 1 in the clockwise direction, or right.

As described above, in the circumferentially inclined orientation, the planes of rotation 20 of the first rotor 14a, the second rotor 14b, the fifth rotor 14e, and the sixth rotor 14f, which rotate clockwise, are inclined in the counterclockwise tangential direction of the circumference. That is, the first rotor 14a, the second rotor 14b, the fifth rotor 14e, and the sixth rotor 14f generate a counterclockwise yawing moment in the same direction as the counterclockwise counter torque acting on the main body 10 by using the yawing moment produced by the propulsion in their inclination directions and the length of the arms 12.

As a result, in the circumferentially inclined orientation, the yaw-rate control tracking performance of the aircraft 1 when turning in the counterclockwise direction, or left, is improved.

In addition, as described above, in the circumferentially inclined orientation, the planes of rotation 20 of the third rotor 14c, the fourth rotor 14d, the seventh rotor 14g, and the eighth rotor 14h, which rotate counterclockwise, are inclined in the clockwise tangential direction of the circumference. That is, the third rotor 14c, the fourth rotor 14d, the seventh rotor 14g, and the eighth rotor 14h generate a clockwise yawing moment in the same direction as the clockwise counter torque acting on the main body 10 by using the yawing moment produced by the propulsion in their inclination directions and the length of the arms 12.

As a result, in the circumferentially inclined orientation, the yaw-rate control tracking performance of the aircraft 1 when turning in the clockwise direction, or right, is improved.

That is, by making the planes of rotation 20 of the rotors 14 have the circumferentially inclined orientation, it is possible to improve the yaw-rate control tracking performance of the aircraft 1.

Figure 6:
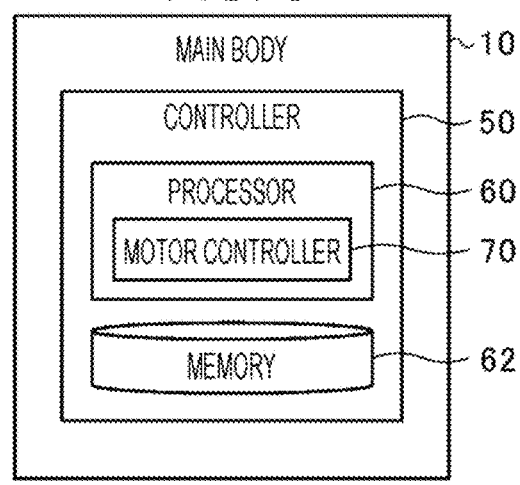
FIG. 6 is a block diagram illustrating a configuration example of a main body.

FIG. 6 is a block diagram illustrating a configuration example of the main body 10. The main body 10 of the aircraft 1 includes a controller 50.

The controller 50 includes at least one processor 60 and at least one memory 62 coupled to the processor 60. The memory 62 includes a ROM that stores a program and the like, and a RAM that serves as a work area. The processor 60 of the controller 50 controls the overall aircraft 1 in cooperation with the program included in the memory 62.

For example, the processor 60 serves as a motor controller 70 for controlling the first motors 16 and the second motors 32 in cooperation with the program.

For example, the motor controller 70 controls the rotational speed of the respective first motors 16 to control the flight of the aircraft 1.

The motor controller 70 automatically controls the flight in accordance with, for example, a flight route stored in advance in the memory 62. The motor controller 70 may control the flight in response to the reception of a real-time control command transmitted from a remote controller or the like.

The motor controller 70 controls the angle of rotation of the respective second motors 32 to control switching between the radially inclined orientation and the circumferentially inclined orientation. For example, the motor controller 70 rotates the second motors 32 by 90 degrees or −90 degrees to switch the orientation between the radially inclined orientation and the circumferentially inclined orientation.

The processor 60 may serve as a mixer that distributes the amount of control for the first motors 16 among first motors 16 or distributes the amount of control for the second motors 32 among second motors 32 in cooperation with the program.

When the aircraft 1 takes off, lands, or hovers, the front side of the aircraft 1 is often made to face the wind so that the aircraft 1 receives the wind from the front. The expression "something is made to face something" means "something is directly opposed to something". Hereinbelow, the orientation of the aircraft 1 in which the front side of the aircraft 1 faces the wind may be referred to as a facing orientation.

By making the aircraft 1 take the facing orientation, the tolerance of the aircraft 1 to wind increases, and thus, the influence of wind on the aircraft 1 can be reduced. When the aircraft 1 takes off, lands, or hovers, the aircraft 1 may turn in the yaw direction so that the aircraft 1 takes the facing orientation.

Hence, the motor controller 70 controls the second motors 32 such that the planes of rotation 20 of the rotors 14 are in the circumferentially inclined orientation when the aircraft 1 takes off, lands, or hovers.

When the planes of rotation 20 of the rotors 14 are in the circumferentially inclined orientation during take-off, landing, or hovering of the aircraft 1, the yaw-rate control tracking performance of the aircraft 1 improves. Thus, it is possible to make the aircraft 1 have the facing orientation easily and accurately. This increases the tolerance of the aircraft 1 to wind, and enables taking off, landing, or hovering to be performed more stably.

Meanwhile, when the aircraft 1 is flying, the aircraft 1 may receive wind from the side.

Hence, when the aircraft 1 is flying, the motor controller 70 controls the second motors 32 such that the planes of rotation 20 of the rotors 14 are in the radially inclined orientation.

When the planes of rotation 20 of the rotors 14 are in the radially inclined orientation while the aircraft 1 is flying, the tracking performance of the aircraft 1 to the pitch-angle control and the roll-angle control improves. Thus, it is possible to easily perform the control for stabilizing the orientation of the aircraft 1. As a result, the aircraft 1 can be made to fly safely.

The aircraft 1 may travel while turning. In this situation, if the turning angle is large, it is desirable to increase the yaw-rate tracking performance of the aircraft 1.

Hence, the motor controller 70 controls the second motors 32 such that the planes of rotation 20 of the rotors 14 are in the circumferentially inclined orientation, when a turning-angle command value instructing the turning angle of the aircraft 1 is greater than or equal to a predetermined threshold during the flight of the aircraft 1.

The predetermined threshold may be set to any value taking into consideration the turning performance of the aircraft 1. The turning-angle command value may be read out at an appropriate time by the program during the flight along a preset flight route. The turning-angle command value may be received in real time from a remote controller or the like.

When the planes of rotation 20 of the rotors 14 are in the circumferentially inclined orientation, the yaw-rate-control tracking performance of the aircraft 1 improves. Thus, even when the turning angle is large, the aircraft 1 can be made to turn with an appropriate turning angle.

Figure 7:
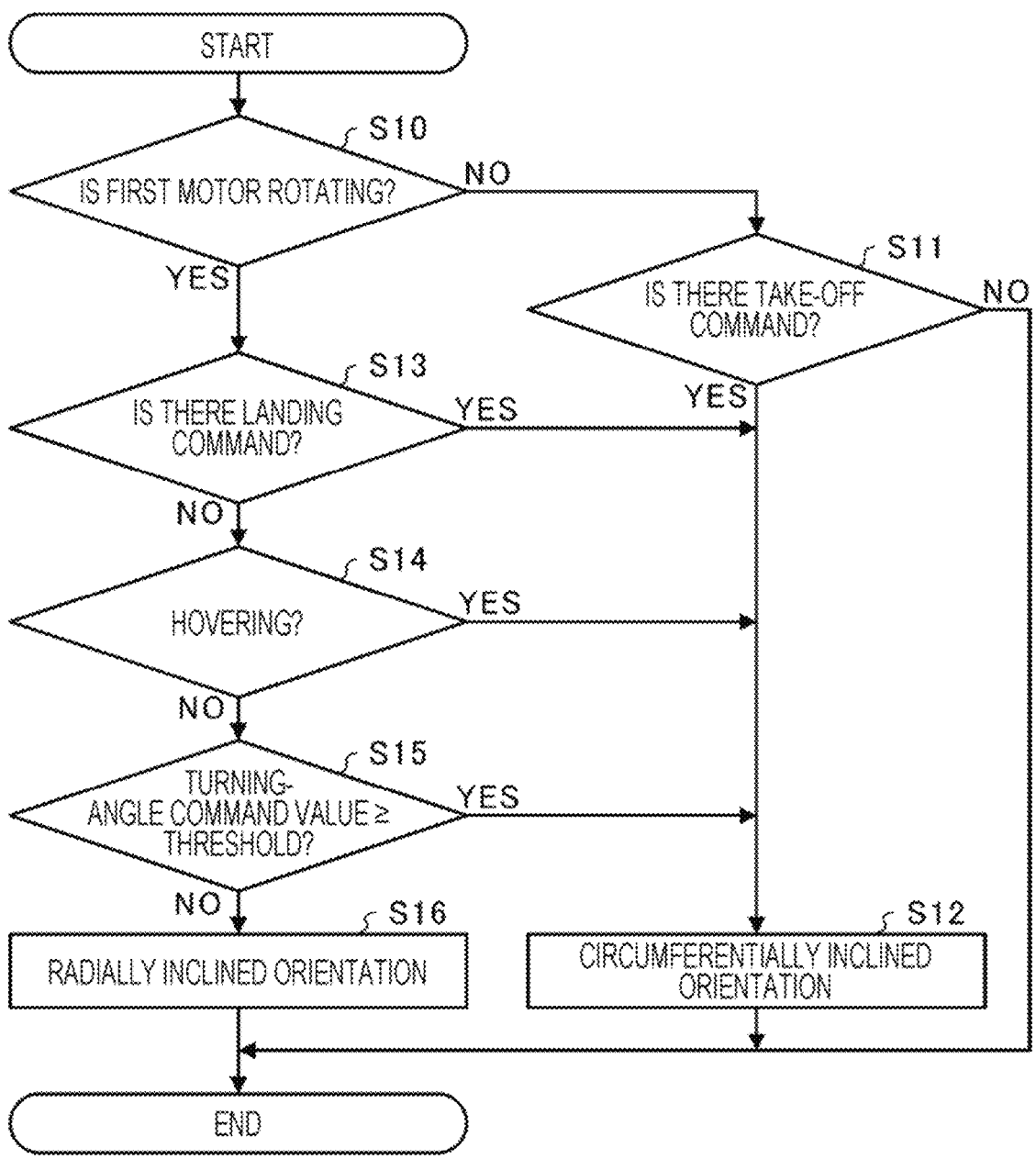
FIG. 7 is a flowchart illustrating a flow of control of second motors performed by a motor controller.

FIG. 7 is a flowchart illustrating a flow of control of the second motors 32 by the motor controller 70. The motor controller 70 executes a series of processing in FIG. 7 each time a predetermined interrupt timing, scheduled to come at a predetermined period, comes.

When the predetermined interrupt timing comes, the motor controller 70 determines whether at least one of the first motors 16 is rotating (S10).

If it is determined that all the first motors 16 are stopped (NO in S10), it is assumed that the aircraft 1 is on the ground, and the motor controller 70 determines whether a take-off command instructing take-off has been received (S11). The take-off command may be read out at an appropriate time by the program or may be received in real time from a remote controller or the like.

When the take-off command is not received (NO in S11), the motor controller 70 ends the series of processing.

When the take-off command is received (YES in S11), the motor controller 70 controls the respective second motors 32 such that the planes of rotation 20 of the rotors 14 are in the circumferentially inclined orientation (S12) and ends the series of processing.

In addition, in step S10, when it is determined that at least any one of the first motors 16 is rotating (YES in S10), it is assumed that the aircraft 1 is in the air, and the motor controller 70 determines whether a landing command instructing landing has been received (S13). The landing command may be read out at an appropriate time by the program or may be received in real time from a remote controller or the like.

When the landing command is received (YES in S13), the motor controller 70 controls the respective second motors 32 such that the planes of rotation 20 of the rotors 14 are in the circumferentially inclined orientation (S12), and ends the series of processing.

When the landing command is not received (NO in S13), the motor controller 70 determines whether the aircraft 1 is hovering (S14). For example, the motor controller 70 may determine that the aircraft 1 is hovering when the amount of change in the speed and the amount of change in the altitude of the aircraft 1 are less than predetermined values.

When it is determined that the aircraft 1 is hovering (YES in S14), the motor controller 70 controls the respective second motors 32 such that the planes of rotation 20 of the rotors 14 are in the circumferentially inclined orientation (S12) and ends the series of processing.

When it is determined that the aircraft 1 is not hovering (NO in S14), it is assumed that the aircraft 1 is flying, and the motor controller 70 determines whether the current turning-angle command value is greater than or equal to the predetermined threshold (S15).

If the turning-angle command value is greater than or equal to the predetermined threshold (YES in S15), the motor controller 70 controls the respective second motors 32 such that the planes of rotation 20 of the rotors 14 are in the circumferentially inclined orientation (S12) and ends the series of processing.

If the turning-angle command value is less than the predetermined threshold (NO in S15), the motor controller 70 controls the respective second motors 32 such that the planes of rotation 20 of the rotors 14 are in the radially inclined orientation (S16) and ends the series of processing.

As described above, the aircraft 1 according to this embodiment includes the motor mounts 30 that support the first motors 16 for rotating the rotors 14, and the second motors 32 for rotating the motor mounts 30 with respect to the arms 12. The motor mounts 30 have the bent parts 44. In the aircraft 1 according to this embodiment, the second motors 32 rotate the motor mounts 30 with respect to the arms 12 to switch the orientation of the planes of rotation 20 of the rotors 14 between the radially inclined orientation and the circumferentially inclined orientation.

Thus, in the aircraft 1 according to this embodiment, by making the planes of rotation 20 of the rotors 14 have the radially inclined orientation, it is possible to improve the tracking performance to the pitch-angle control and the roll-angle control. Furthermore, in the aircraft 1 according to this embodiment, by making the planes of rotation 20 of the rotors 14 have the circumferentially inclined orientation, it is possible to improve the yaw-rate control tracking performance.

Accordingly, the aircraft 1 according to this embodiment has improved control performance.

Furthermore, with the aircraft 1 according to this embodiment, it is possible to switch the orientation of the planes of rotation 20 of the rotors 14 between the radially inclined orientation and the circumferentially inclined orientation only with the second motors 32, which rotate the bent motor mounts 30 about the axes extending in the extending direction of the mount proximal ends 40. Therefore, the aircraft 1 according to this embodiment uses only one type of second motors 32, and thus, an increase in the weight of the aircraft 1 is avoided, compared with a comparative example in which the aircraft uses two types of motors, namely, motors for making the rotors have the radially inclined orientation and motors for making the rotors have the circumferentially inclined orientation.

Although embodiments of the present disclosure has been described above with reference to the accompanying drawings, the present disclosure is not limited to such embodiments. It is apparent that those skilled in the art can conceive various modifications or corrections within the scope described in the claims, and it is understood that such modifications or corrections belong to the technical scope of the present disclosure.

For example, in the above embodiment, the aircraft 1 has been described as an unmanned aerial vehicle. However, the aircraft 1 is not limited to an unmanned aerial vehicle, and may be a manned aerial vehicle.

In the above embodiment, the bent parts 44 of the motor mounts 30 are bent at a fixed angle. However, the bending angle of the bent parts 44 of the motor mounts 30 may be changed by third motors.

In the above-described embodiment, the radially inclined orientation and the circumferentially inclined orientation are switched by rotating the second motors 32. However, for example, switching from the circumferentially inclined orientation to the radially inclined orientation may be performed by actuators, and switching from the radially inclined orientation to the circumferentially inclined orientation may be performed by elastic members.

An embodiment of the present disclosure improves the aircraft control performance.

For example, Japanese Patent No. 6772917 describes an unmanned aerial vehicle having rotors. The rotors are supported by arms via linear rotor supports. The rotor supports extending perpendicularly to the arms are tiltable in directions away from a main body.

An aspect of the disclosure provides an aircraft including a main body, arms, rotors, first motors, motor mounts, and second motors. The arms extend substantially horizontally from the main body. The rotors are each located at a distal end of a corresponding arm of the arms and generate lift by rotating. The first motors are each coupled to a corresponding rotor of the rotors and rotate the corresponding rotor. The motor mounts support the first motors respectively. The second motors rotate the motor mounts relative to the arms respectively. The motor mounts each include a mount proximal end adjacent to the corresponding arm, a mount distal end adjacent to a corresponding first motor of the first motors, and a bent part bent at a predetermined angle. The first motors are each fixed to the mount distal end such that an axis of rotation of the corresponding rotor is inclined with respect to the mount proximal end. The mount proximal end is disposed so as to extend substantially vertically upward from the corresponding arm. The motor mounts are each coupled to the distal end of the corresponding arm so as to be rotatable about an axis extending in an extending direction of the mount distal end. The second motors each rotate the mount proximal end with respect to the corresponding arm to switch an orientation of a plane of rotation of the corresponding rotor between a radially inclined orientation in which the plane of rotation is inclined in a radial direction away from the main body and a circumferentially inclined orientation in which the plane of rotation is inclined in a tangential direction of a circumference around the main body.

The technique described in Japanese Patent No. 6772917 is capable of tilting the planes of rotation of the rotors in directions away from the main body. By making the planes of rotation of the rotors have such an orientation, it is possible to improve the tracking performance to the pitch-angle control and the roll-angle control during the flight.

However, in the aircraft, control for turning the aircraft in the yaw direction is also performed. With the technique described in Japanese Patent No. 6772917, it is difficult to improve the yaw-rate control performance.

It is desirable to provide an aircraft with improved control performance.

Obviously, numerous modifications and variations of the present invention are possible in light of the above teachings. It is therefore to be understood that within the scope of the appended claims, the invention may be practiced otherwise than as specifically described herein.

The invention claimed is:

1. An aircraft, comprising:
a main body;
a plurality of arms extending substantially horizontally from the main body;
a plurality of rotors each positioned at a distal end of a corresponding arm of the arms and configured to generate lift by rotating;
a plurality of first motors each coupled to a corresponding rotor of the rotors and configured to rotate the corresponding rotor;
a plurality of motor mounts supporting the first motors respectively; and
a plurality of second motors configured to rotate the motor mounts relative to the arms respectively,
wherein each of the motor mounts comprises a mount proximal end adjacent to the corresponding arm, a mount distal end adjacent to a corresponding first motor, and a bent part bent at a predetermined angle, each of the first motors is fixed to the mount distal end such that an axis of rotation of the corresponding rotor is inclined with respect to the mount proximal end, the mount proximal end is disposed so as to extend substantially vertically upward from the corresponding arm, the motor mounts are each coupled to the distal end of the corresponding arm so as to be rotatable about an axis extending in an extending direction of the mount proximal end, and each of the second motors is configured to rotate the mount proximal end with respect to the corresponding arm to switch an orientation of a plane of rotation of the corresponding rotor between a radially inclined orientation in which the plane of rotation is inclined in a radial direction away from the main body and a circumferentially inclined orientation in which the plane of rotation is inclined in a tangential direction of a circumference around the main body.

2. The aircraft according to claim 1, further comprising:
a controller comprising circuitry configured to control the first motors and the second motors,
wherein the circuitry of the controller includes at least one processor and at least one memory coupled to the processor, and the at least one processor is configured to execute processing including controlling each of the second motors such that the plane of rotation of the corresponding rotor is in the circumferentially inclined orientation during take-off, landing, or hovering.

3. The aircraft according to claim 1, further comprising:
a controller comprising circuitry configured to control the first motors and the second motors,
wherein the controller includes at least one processor and at least one memory coupled to the processor, and the at least one processor is configured to execute processing including controlling each of the second motors such that the plane of rotation of the corresponding rotor is in the radially inclined orientation during flight.

4. The aircraft according to claim 1, further comprising:
a controller comprising circuitry configured to control the first motors and the second motors,
wherein the circuitry of the controller includes at least one processor and at least one memory coupled to the processor, and the at least one processor is configured to execute processing including controlling each of the second motors such that the plane of rotation of the corresponding rotor is in the circumferentially inclined orientation when a turning-angle command value instructing a turning angle at a time of turning during flight is higher than or equal to a predetermined threshold.

* * * * *